(12) United States Patent
Sundaravaradan et al.

(10) Patent No.: US 8,832,012 B2
(45) Date of Patent: Sep. 9, 2014

(54) SYSTEM AND METHOD FOR TREE DISCOVERY

(75) Inventors: Naren Sundaravaradan, Blacksburg, VA (US); Debprakash Patnaik, Blacksburg, VA (US); Manish Marwah, Palo Alto, CA (US); Amip Shah, Santa Clara, CA (US); Naren Ramakrishnan, Blacksburg, VA (US)

(73) Assignee: Hewlett-Packard Development Company, L. P., Houston, TX (US)

( * ) Notice: Subject to any disclaimer, the term of this patent is extended or adjusted under 35 U.S.C. 154(b) by 310 days.

(21) Appl. No.: 13/282,388

(22) Filed: Oct. 26, 2011

(65) Prior Publication Data

US 2012/0185421 A1      Jul. 19, 2012

Related U.S. Application Data

(60) Provisional application No. 61/433,107, filed on Jan. 14, 2011.

(51) Int. Cl.
*G06F 17/00*      (2006.01)

(52) U.S. Cl.
USPC .......................................................... 706/45

(58) Field of Classification Search
CPC ......... G06N 5/04; G06N 99/005; G06N 5/02; G06N 5/048; H04L 47/10
USPC .............. 706/11, 45, 52, 54–55; 707/10, 709, 707/737, 756, 758, 803; 370/252
IPC .. G06N 5/04, 99/005, 5/02, 5/048; H04L 47/10
See application file for complete search history.

(56) References Cited

U.S. PATENT DOCUMENTS

| | | | |
|---|---|---|---|
| 5,852,560 A | 12/1998 | Takeyama et al. | |
| 6,049,797 A * | 4/2000 | Guha et al. | 1/1 |
| 6,415,283 B1 | 7/2002 | Conklin | |
| 6,490,569 B1 | 12/2002 | Grune et al. | |
| 6,532,464 B1 * | 3/2003 | Miyamoto | 1/1 |
| 6,564,197 B2 * | 5/2003 | Sahami et al. | 706/55 |

(Continued)

FOREIGN PATENT DOCUMENTS

| | | |
|---|---|---|
| WO | 00/41114 | 7/2000 |
| WO | 01/26044 | 4/2001 |

OTHER PUBLICATIONS

Sundaravaradan N. et al., "Discovering Life Cycle Assessment Trees from Impact Factor Databases", Proceedings of the Twenty-Fifth AAAI Conference on Artificial Intelligence, pp. 1415-1420, Aug. 7-11, 2011.*

(Continued)

*Primary Examiner* — Li-Wu Chang
*Assistant Examiner* — Dave Misir

(57) ABSTRACT

Tree discovery systems and methods are disclosed. An example of a method is carried out by program code stored on non-transient computer-readable medium and executed by a processor. The method may include identifying in computer-readable medium a first node for a system under consideration, each node in the computer-readable medium representing a characteristic of a component. The method may include selecting at least a second node from the computer-readable medium for the first node. The method may include discovering in the computer-readable medium at least one system tree for the system under consideration based on the first node and the at least second node.

20 Claims, 7 Drawing Sheets

(56) References Cited

U.S. PATENT DOCUMENTS

| | | | |
|---|---|---|---|
| 6,691,044 | B2 | 2/2004 | Kobayashi et al. |
| 6,742,001 | B2 | 5/2004 | Ripley |
| 6,757,242 | B1 | 6/2004 | Wang et al. |
| 6,862,540 | B1 | 3/2005 | Welch et al. |
| 7,007,069 | B2 | 2/2006 | Newman et al. |
| 7,058,644 | B2 | 6/2006 | Patchet et al. |
| 7,151,752 | B2 | 12/2006 | Founn et al. |
| 7,197,504 | B1* | 3/2007 | Runkler et al. ............... 1/1 |
| 7,272,607 | B2 | 9/2007 | Udeshi et al. |
| 7,287,026 | B2* | 10/2007 | Oommen ..................... 1/1 |
| 7,310,624 | B1* | 12/2007 | Aggarwal et al. ........... 706/45 |
| 7,366,110 | B2 | 4/2008 | Gillespie et al. |
| 7,415,418 | B2 | 8/2008 | Zimmerman |
| 7,536,476 | B1 | 5/2009 | Alleyne |
| 7,620,632 | B2 | 11/2009 | Andrews |
| 7,634,464 | B2 | 12/2009 | Chen et al. |
| 7,668,100 | B2 | 2/2010 | Balasaygun et al. |
| 7,707,085 | B2 | 4/2010 | Sakurai et al. |
| 7,725,499 | B1* | 5/2010 | von Lepel et al. ........... 707/803 |
| 7,801,878 | B2 | 9/2010 | Hayes et al. |
| 7,831,416 | B2 | 11/2010 | Grichnik et al. |
| 7,958,257 | B2 | 6/2011 | Gershinsky et al. |
| 8,145,732 | B2 | 3/2012 | Kumar et al. |
| 8,352,465 | B1 | 1/2013 | Jing et al. |
| 2002/0032684 | A1 | 3/2002 | Kobayashi et al. |
| 2002/0099587 | A1 | 7/2002 | Kakihana et al. |
| 2002/0116161 | A1* | 8/2002 | Freeman et al. ........... 703/13 |
| 2004/0172442 | A1* | 9/2004 | Ripley ........................ 709/200 |
| 2004/0181526 | A1 | 9/2004 | Burdick et al. |
| 2005/0021490 | A1 | 1/2005 | Chen et al. |
| 2005/0027681 | A1* | 2/2005 | Bernstein et al. ........... 707/1 |
| 2005/0086208 | A1 | 4/2005 | Bestgen et al. |
| 2007/0260595 | A1 | 11/2007 | Beatty et al. |
| 2007/0294291 | A1 | 12/2007 | Sasaki et al. |
| 2008/0154926 | A1* | 6/2008 | Newman ..................... 707/100 |
| 2008/0250357 | A1 | 10/2008 | Lee et al. |
| 2009/0083390 | A1 | 3/2009 | Abu-Ghazaleh |
| 2009/0125529 | A1* | 5/2009 | Vydiswaran et al. ........ 707/100 |
| 2009/0248624 | A1* | 10/2009 | Lammel et al. .............. 707/3 |
| 2009/0313041 | A1 | 12/2009 | Eder |
| 2010/0076687 | A1 | 3/2010 | DeYoung et al. |
| 2010/0094885 | A1* | 4/2010 | Andrews ..................... 707/756 |
| 2010/0100403 | A1 | 4/2010 | Pollock et al. |
| 2010/0145629 | A1 | 6/2010 | Botich |
| 2010/0165886 | A1 | 7/2010 | Borril |
| 2010/0179794 | A1 | 7/2010 | Shah et al. |
| 2010/0223211 | A1* | 9/2010 | Johnson et al. ............. 706/11 |
| 2010/0235300 | A1 | 9/2010 | Feingold |
| 2010/0332444 | A1* | 12/2010 | Akatsu et al. ............... 706/54 |
| 2010/0332475 | A1* | 12/2010 | Birdwell et al. ............. 707/737 |
| 2011/0161311 | A1 | 6/2011 | Mishne et al. |
| 2011/0173197 | A1 | 7/2011 | Mehta et al. |
| 2011/0307468 | A1* | 12/2011 | Duan et al. .................. 707/709 |
| 2012/0106367 | A1* | 5/2012 | Barkol et al. ................ 370/252 |
| 2012/0185422 | A1 | 7/2012 | Shah et al. |
| 2012/0185477 | A1 | 7/2012 | Shah et al. |
| 2012/0185489 | A1 | 7/2012 | Shah et al. |
| 2012/0185508 | A1 | 7/2012 | Shah et al. |

OTHER PUBLICATIONS

Romanowski C. et al., "Data mining in an engineering design environment: or applications from graph matching", Computers & Operations Research, 33, 2006, pp. 3150-3160.*

Sundaravaradan N. et al., "Data Mining Approaches for Life Cycle Assessment", IEEE ISSST, May 16-18 2011.*

DeLisle R. et al., Induction of Decision Trees via Evolutionary Programming, J. Chem. Inf. Comput. Sci. 2004, 44, pp. 862-870.*

Jeong Min Moon, Ki Suk Chung, Jong Hwan Eun and Jong Shik Chung, Life Cycle Assessment Through On-Line Database Linked With Various Enterprise Database Systems, The International Journal of Life Cycle Assessment, vol. 12, No. 7, 488-498, DOI: 10.1065/lca2006.10.276, Publication Date: 2003: vol. 8; on pp. 226-234.

Sustainable Minds Release 1.0 Offers Product Life Cycle Assessment for Autodesk Inventor Users Import of Bill of Materials Data Provides Seamless Interoperability, http://www.pitchengine.com/pitch/30787, Oct. 27, 2009.

Laurin, L.; Norris, G., Goedkeep, M. Automated LCA—a Practical Solution for Electronics Manufacturers?, http://ieeexplore.ieee.org/xpl/mostRecentIssue.jsp?punumber=10977, May 8-11, 2006.

Haung, X., et al., "Clustering Graphs for Vizualization Via Node Similarities", Journal of Visual Languages and Computing, 17, 2006, 225-253.

Bouley, "Estimating a Data Center's Electrical Carbon Footprint", research paper.

Ross, et al. "Collaborative Filtering and Carbon Footprint Calculation", Department of Informatics, May 17-19, 2010, pp. 1-6, University of California.

Cai, et al., "A Singular Value Thresholding Algorithm for Matrix Completion".

Romanowski, "A Data Mining Approach to Forming Generic Bills of Materials in Support of Varient Design Activities".

Torsello, "Four Metrics for Efficiently Comparing Attributed Trees", Aug. 23-26, 2004, vol. 2, pp. 467-470.

Romanowski, "On Comparing Bills of Materials: a Similarity/Distance Measure for Unordered Trees".

"Eco-Indicator 95", available at http://www.pre.nl.eco-indicator95/eco-indicator95.htm#Background.

Cheng, et al., "A Web Service Framework for Environment and Carbon Footprint Monitoring in Construction Supply Chains," available at http://eif.stanford.edu/publications/jack_cheng/jack_greenSCOR_web_final.pdf.

Koutitas, "Low Carbon Network Planning," Apr. 12-15, 2010, pp. 411-417.

Gautam, et al., "Context-Based Similarity Measures for Categorical Databases," Publication Date: 2000; pp. 201-210.

Tae-wan Ryn and Eick, "Similarity Measures for Multi-Valued Attributes for Database Clustering", available at http://citeseerx.ist.psu.edu/viewdoc/download?doi=10.1.1.54.3544&rep=rep1&type=pdf.

Cai, et al., "Categorical Clustering by Converting Associated Information", publicationd date 2006, pp. 31-36.

Sundaravaradan, N., et al., "Discovering Life Cycle Assessment Trees from Impact Factor Databases", Proceedings of the Twenty-Fifth AAAI Conference on Artificial Intelligence, pp. 1415-1420, Aug. 7-11, 2011.

Romanowski, C., et al., "Data Mining in an Engineering Design Environment: OR Applications from Graph Matching": Computers & Operations Research, 33, 2006, pp. 3150-3160.

Sundaravaradan, N., et al., "Data Mining Approaches for Life Cycle Assessment", IEEE ISSST, May 16-18, 2011.

Delisle, R., et al., Induction of Decision Trees via Evolutionary Programming, J. Chem., Inf. Comput. Sci. 2004, 44, pp. 862-870.

* cited by examiner

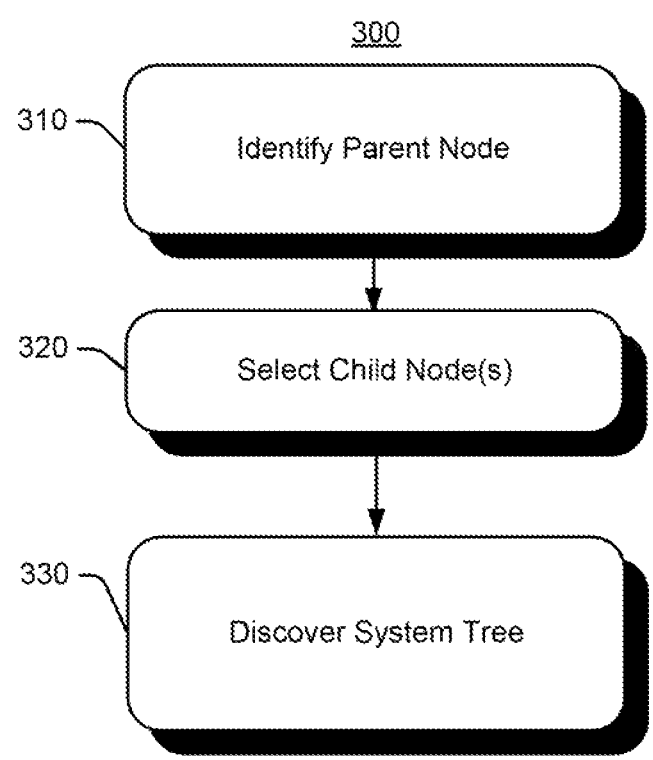

SYSTEM AND METHOD FOR TREE DISCOVERY

PRIORITY CLAIM

This patent application claims the benefit of U.S. provisional patent application No. 61/433,107 filed on Jan. 14, 2011 titled "System and method for tree discovery" of Amip J. Shah, et al., hereby incorporated by reference for the disclosed subject matter as though fully set forth herein.

CROSS-REFERENCE TO RELATED APPLICATIONS

This patent application is related to U.S. patent applications identified by the following U.S. patent application Nos. 13/007,229, 13/007,252, 13/007,270 (issued as U.S. Pat. Nos. 8,626,693), 13/007,073, 13/007,175, 13/007,125, and 13/007,152, each filed the same day as this patent application, and each incorporated by reference for the disclosed subject matter as though fully set forth herein.

BACKGROUND

Manufacturers in various industries use proprietary databases to track the price of individual components used during manufacturing, to determine how the change in price of various components impacts the overall price for their products. For example, a packaging manufacturer may maintain a database including price to obtain the stock materials (e.g., cardboard, plastic, and ink), produce the packaging (e.g., including cutting the cardboard, extruding the plastic, and printing the labels), and delivering the packaging to their customers. When the price of a component changes (e.g., fuel prices rise, thereby raising the price to obtain the stock materials and delivery), the manufacturer is able to use their database to quickly determine the overall impact the component change in price has on the overall price of their product so that the manufacturer can raise the price of their product (or make other adjustments) in a timely manner to reduce or eliminate any impact on their profit.

Manufacturers can also consider the impact of their products on the environment and other parameters. Electronics devices (e.g., computers, printers, and mobile phones), can be a concern because these devices typically have very short lifetimes and are commonly discarded by consumers when newer devices become available. For example, users may discard their mobile phone every two years when they are offered free or discounted equipment to renew their mobile phone contract with their carrier. Consumers also may discard their computers, televisions, and other appliances after only a few years of service, often because it is less expensive to replace than to repair.

Life Cycle Analysis (LCA) databases are beginning to become publicly available. For example, the Open LCA initiative is a public domain data sharing protocol. These databases may include, for example, data related to the mining efforts of raw materials, in addition to the disposal/recycling efforts to handle the components of products after consumers discard the products. These databases have thus far experienced limited adoption.

The databases include vast amounts of data that can be useful to manufacturers given the component breakdown of current products. It is said, for example, that a product as simple as a pen can include over 1500 parameters when considered on a cradle-to-grave basis.

These databases provide no analysis of the data for the manufacturer. For example, while a user may be able to use these databases to check whether the use of a particular plastic might have a bigger impact than another type of plastic, the database still provides no other information that the manufacturer can use to make, e.g., business decisions.

BRIEF DESCRIPTION OF THE DRAWINGS

FIG. 3 is a flowchart illustrating example operations of tree discovery that may be implemented.

DETAILED DESCRIPTION

Figure 1A:
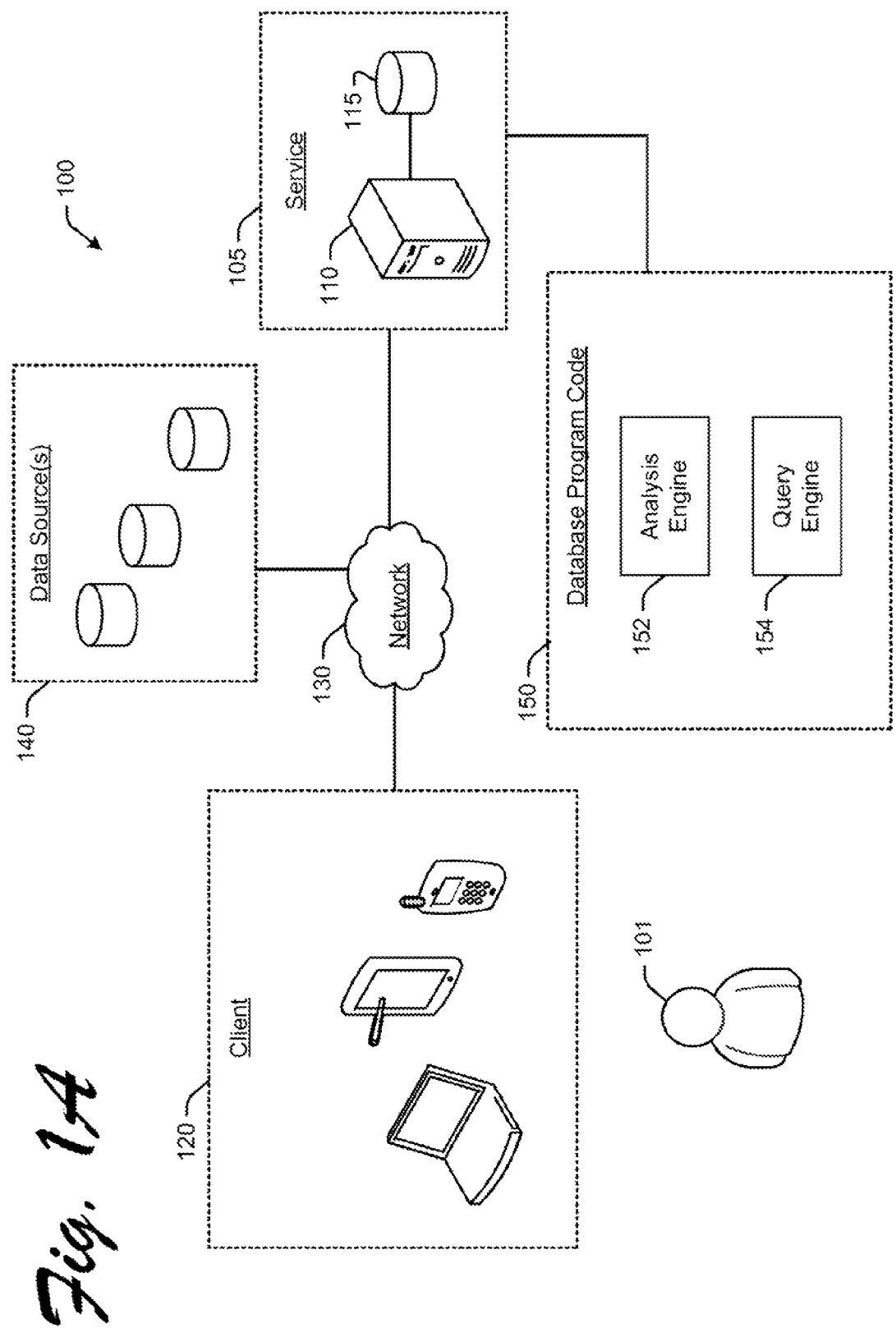
FIG. 1A is a high-level block-diagram of an example computer system that may implement component substitution.

A user may use conventional databases to determine whether a component in a product might have a higher price or a bigger impact than another component. But design decisions can be more complex than this. For example, designers, manufacturers, and others may take into consideration a wide variety of characteristics of many different components of the overall device or service (referred to broadly herein as a "system"). Other factors that may also be considered include the intended use of the product, availability of components, customer demand, regulations and laws, to name only a few examples.

As used herein, the term "includes" means includes but not limited to, the term "including" means including but not limited to. The term "based on" means based at least in part on.

In manufacturing, for example, simply substituting a plastic component for a metal component in a product because it has a lower environmental impact may not be possible based on one or more other consideration. For example, a certain type of plastic may indeed have a lower environmental impact, but lacks durability (affecting customer satisfaction and/or warranty). Therefore, the plastic may not be a suitable substitution for the metal component. In another example, the plastic may be more expensive than the metal, or fail on some other parameter. Decisions to substitute components cannot be made by simply consulting a database, without some analysis of many different information paths.

Briefly, tree discovery systems and methods are disclosed herein which enable automated large-scale data analysis for making informed design decisions. An example includes a computer readable storage to store at least one system tree having a plurality of nodes. The system tree may be stored in a data structure (e.g., a database). Each node in the system tree represents a characteristic of a component of an electronic device. For example, a system tree for a new computer may include a keyboard node, a motherboard node, a hard disk drive node, and a display node. Each node may also include child nodes. For example, the motherboard node may also include child nodes for motherboard components, such as the onboard memory, and processor. The database may include information about price of the product, environmental impact, performance, product warranty, customer satisfaction, among others, for each of the nodes in the tree. The information may be referred to generally as "cost." That is, the term "cost" may include price, carbon footprint, energy consumption (e.g., kilowatt hours), number of warranty calls and/or price associated with those warranty calls, and any other suitable metric for characterizing different components of the system.

Inventory in the database can be represented as a tree with a system as the root node and the constituents as its children nodes. A database includes the impact of these constituents. The total impact of the parent can be considered the sum of the impacts of all its children nodes. However, in many instances, such trees are not already known. Therefore, "discovering" these trees in a database of nodes may be challenging. Furthermore, the data may be incomplete and/or "noisy," adding to the complexity of the problem. The systems and methods described herein address the problem of discovering trees in a database using data mining techniques.

Specifically, data mining techniques that may be used to discover trees may be implemented as follows. The system under consideration forms the parent/root of the tree and the constituents of the system are its children. The database is searched such that the impact of the parent node correlates with or substantially correlates with the impacts of the children nodes within a threshold degree of accuracy. In an example, the impact of the parent node correlates with or substantially correlates with the sum of the impacts of the children nodes within a threshold degree of accuracy. In an example, for a high degree of correlation, the impact of the parent node matches or substantially matches the sum of the impacts of the children nodes within a threshold degree of accuracy. Since exhaustive enumeration of all possible child nodes may not be practical (considering the number of nodes in the database), sampling may be used. Once a set of children nodes are selected for a parent, statistical analysis, such as non-negative least squares (NNLS), may be used to determine the coefficients of those children nodes. In an example, a four-step process may be utilized to search for a tree.

After the children nodes and corresponding coefficients of the system under consideration is determined, the impact contribution of each child node to the parent node impact can be estimated. Such a technique allows identification of the children nodes that contribute the most to any given impact. This information may also be used to improve the design of the system under consideration.

The systems and methods described herein provide for component substitution based on a knowledge base of information for existing components. The systems and methods described herein can be used to meet or exceed customer expectations, marketing goals, environmental impact, and/or other considerations for the system, without the need to develop new components.

FIG. 1A is a high-level block-diagram of an example computer system 100 that may implement tree discovery. System 100 may be implemented with any of a wide variety of computing devices, such as, but not limited to, stand-alone desktop/laptop/netbook computers, workstations, server computers, blade servers, mobile devices, and appliances (e.g., devices dedicated to providing a service), to name only a few examples. Each of the computing devices may include memory, storage, and a degree of data processing capability at least sufficient to manage a communications connection either directly with one another or indirectly (e.g., via a network). At least one of the computing devices is also configured with sufficient processing capability to execute the program code described herein.

In an example, the system 100 may include a host 110 providing a service 105 accessed by a user 101 via a client device 120. For purposes of illustration, the service 105 may be a data processing service executing on a host 110 configured as a server computer with computer-readable storage 112. The client 120 may be any suitable computer or computing device (e.g., a mobile device) capable of accessing the host 110. Host 110 and client 120 are not limited to any particular type of devices. It is also possible for the host 110 and client 120 to be the same device (e.g., a kiosk platform). Although, it is noted that the database operations described herein which may be executed by the host 110 are typically better performed on a separate computer system having more processing capability, such as a server computer or plurality of server computers. The user interface may be provided on any computing device for providing data to, and receiving data from, service 105.

The system 100 may also include a communication network 130, such as a local area network (LAN) and/or wide area network (WAN). In one example, the network 130 includes the Internet or other mobile communications network (e.g., a 3G or 4G mobile device network). Network 130 provides greater accessibility to the service 105 for use in distributed environments, for example, where more than one user may have input and/or receive output from the service 105.

In an example, the host 110 is implemented with (or as part of) the service 105 in the networked computer system 100. For example, the service 105 may be a cloud-based service, wherein the host 110 is at least one server computer in a cloud computing system. The host 110 may be provided on the network 130 via a communication connection, such as via an Internet service provider (ISP). In this regard, the client 120 is able to access host 110 directly via the network 130, or via an agent, such as a network site. In an example, the agent may include a web portal on a third-party venue (e.g., a commercial Internet site), which facilitates a connection for one or more clients 120 with host 110. In another example, portal icons may be provided (e.g., on third-party venues, pre-installed on a computer or mobile device, etc.) to facilitate a communications connection between the host 110 and client 120.

Before continuing, it is noted that the host 110 is not limited in function. The host 110 may also provide other services to other computing or data processing systems or devices in the system 100. For example, host 110 may also provide transaction processing services, email services, etc.

In addition, the host 110 may be operable to communicate with at least one information source 140. The source 140 may be part of the service 105, and/or the source 140 may be distributed in the network 130. The source 140 may include any suitable source(s) for information about various system components. For example, the source 140 may include manufacturer specifications, proprietary databases, public databases, and/or a combination of these, to name only a few examples of suitable sources. The source 140 may include automatically generated and/or manual user input. If the source 140 includes user-generated data, an appropriate filter may be applied, e.g., to discard "bad" data or misinformation. There is no limit to the type or amount of information that may be provided by the source 140. In addition, the information may include unprocessed or "raw" data. Or the data may undergo at least some level of processing.

The host 110 may execute analytics using the information from the source 140 to generate output for use in component substitution for a system under consideration. For example, the host 110 receives information from the source 140 including environmental impact based on a cradle-to-grave assessment for various components that may be used to manufacture an electronic device or to provide a service. The host 110 may maintain the results in at least one data structure (e.g., a matrix or table or database) in computer-readable media 115. The data structure may be accessed by the host 110, which performs analytics based on input by the client 120, and outputs the results for the user at the client 110.

In an example, the host 110 performs the analytics described herein by executing database program code 150. The database program code 150 may include an analysis engine 152 and a query engine 154. In an example, the analytics engine 152 may be integrated into the query engine 154. The analytics engine 152 may be an SQL-based analytics engine, and the query engine 154 may be an SQL query engine. However, the operations described herein are not limited to any specific implementation with any particular type of database.

A system that implements component substitution as described herein has the capability to take a description of a system under consideration (including, in terms of inherent properties of the device or service), and assess the characteristics (e.g., price, environmental footprint, customer satisfaction, warranty) of the individual components comprising the system under consideration. A list of substitute components and/or an assessment of various designs may be output. Component substitution may be better understood with reference to the following discussion of an example implementation of machine readable instructions.

Figure 1B:
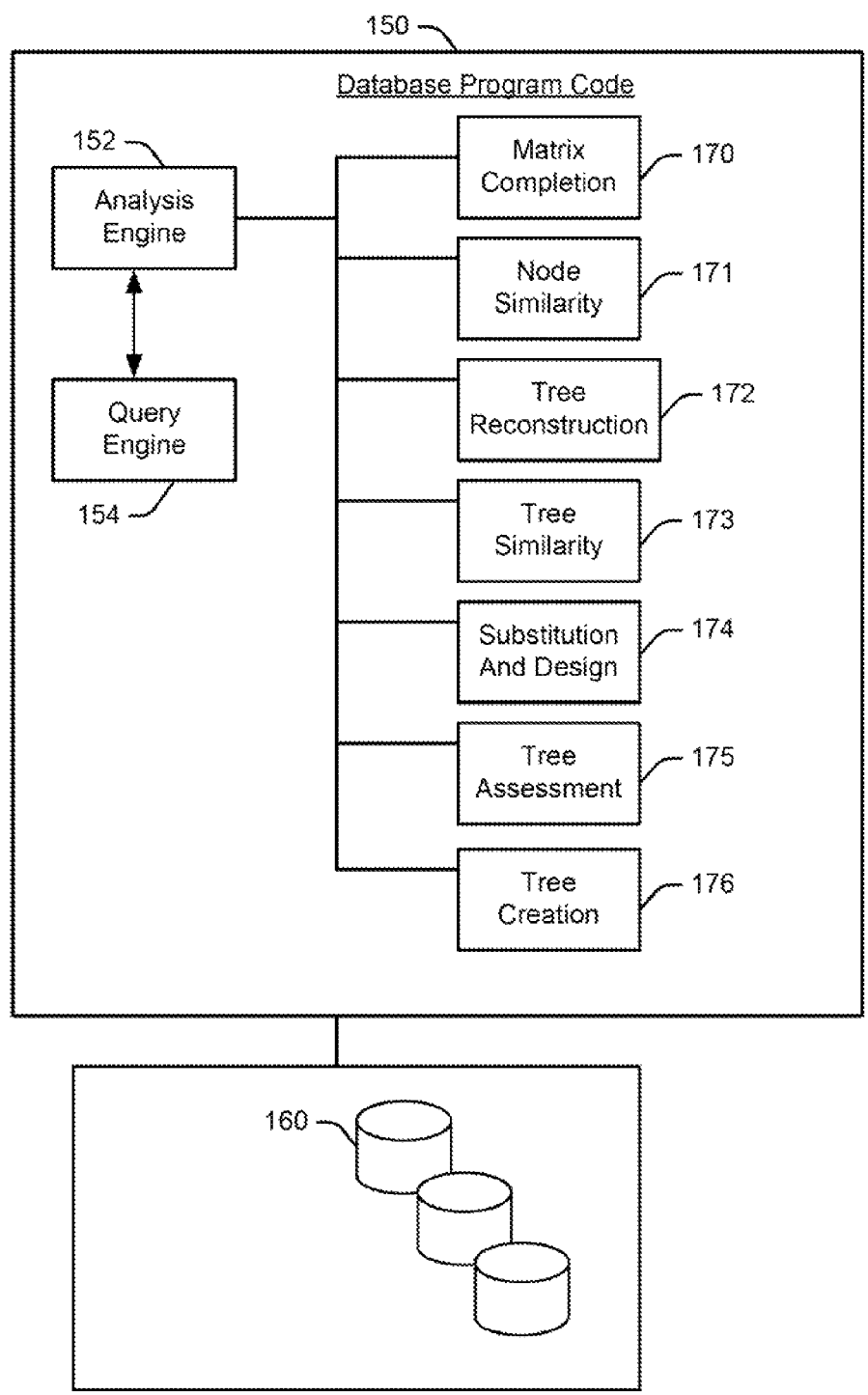
FIG. 1B shows an example architecture of machine readable instructions for database program code which may execute tree discovery program code.

FIG. 1B shows an example architecture of machine readable instructions for the database program code 150 that may execute component substitution program code. In an example, the database program code 150 may be implemented in machine-readable instructions (such as but not limited to, software or firmware) stored on a computer readable medium (e.g., storage 115 in FIG. 1A) and executable by one or more processor (e.g., on host 110 in FIG. 1A) to perform the operations described herein. The database program code 150 may perform operations on at least one database 160 (or other data structure). The database 160 may be provided on the same or different computer readable medium (e.g., storage 115 in FIG. 1A). It is noted, however, the components shown in FIGS. 1A and 1B are provided only for purposes of illustration of an example operating environment, and are not intended to limit execution to any particular computing system.

During operation, the analysis engine 152 may be operatively associated with the query engine 154 to execute the function of the architecture of machine readable instructions as self-contained modules. These modules can be integrated within a self-standing tool, or may be implemented as agents that run on top of an existing database. Existing data are used as seed data to populate a matrix. A comparison is then run on the populated matrix using node comparison techniques (and related algorithms). After a set of similar nodes has been identified, trees are constructed to identify the structure resident within the similar nodes. The constructed tree is then compared to the system tree. When a similar tree (or set of trees) has been identified, the tree(s) are assessed for one or more parameter (e.g., environmental footprint). In an example, one or more node (e.g., portions of trees or even entire trees) may be substituted in the system tree. For example, the offending node(s) may be replaced with potentially better rated nodes, and also assessed to identify a better rated tree. The highly-rated tree(s) are used to mine the populated matrix for novel sub-trees from other systems, which may lead to a better rated solution for designing the new system.

In an example, the architecture of machine readable instructions may include a matrix completion module 170. The matrix completion module 170 may populate the database with information related to various systems. The information may include price and environmental impact, among other characteristics. Existing data from commercial databases, published literature, or internal systems may be used as seed data. The seed data is then expanded through one or more of data mining, knowledge discovery, regression, and/or other techniques. In this manner, a few starting points of readily available data are used initially, and more comprehensive information can be constructed for the database.

The architecture of machine readable instructions may also include a node similarity module 171. The node similarity module 171 may be used to identify relevant characteristics of the system being assessed. These characteristics may be relevant to at least one of the parameters. For example, the published energy use rate for the system is directly related to environmental impact. But the characteristics may also include part name, part number, composition, etc. The relevant characteristics are then compared to the matrix of information in the database to identify any similar nodes. These nodes may be considered to be similar at the root (e.g., two different laptop computers), or similar in terms of other relational characteristics (e.g., a computer housing and a printer housing).

The architecture of machine readable instructions may also include a tree reconstruction module 172. After a group of related nodes have been identified, the tree reconstruction module 172 further outlines how the identified nodes are structurally related to one another. In an example, a root node is detected or inputted, and then the remaining nodes are identified as children or non-children of the root node. Based on the identified children nodes, a hierarchical structure may be generated which is used to construct a tree.

The architecture of machine readable instructions may also include a tree similarity module 173. After constructing a tree of relevant nodes from the populated matrix, this tree is then compared to the system tree. The system tree may be assessed, and a bill-of-materials developed. Examples of methods to identify metrics for comparing two trees, include but are not limited to, tree depth, breadth, and distance between relative nodes. The output may include a similarity rating relative to identified trees of relevance in the populated matrix.

The architecture of machine readable instructions may also include a tree substitution and design module 174. After two or more trees of relevance have been identified, opportunities to replace "offending" nodes in the system tree may be sought. For example, a laptop computer may be identified as being similar to another laptop computer stored in the database. Suppose the processors of each laptop computer are identified as the offender. Then, if the processor of another laptop computer tree has a lower environmental footprint than the processor in the system tree, the processor node in the other laptop tree may be substituted for the processor node in the system tree. The new system tree results in a laptop computer having a lower environmental footprint. Next, the tree substitution and design module moves on to the next highest offender (e.g., the hard disk drive node), and the process repeats. The output results in a new tree having a lower environmental footprint.

The architecture of machine readable instructions may also include a tree assessment module 175. The tree assessment module 175 may be used to assess a system under consideration, rather than redesigning the system. In an example, the total environmental footprint of the tree may be calculated based on the similarity metrics identified by the tree similarity module. Methods to rapidly calculate the footprint of very large trees based on a hierarchy of nodes with similar grouping may be utilized. The output of the tree assessment module may include an estimated environmental footprint of the system tree. Additional metrics of relevance may also be output. For example, additional metrics may include but are not limited to, the minimum calculated environmental footprint of substitutive trees, the most similar tree with a lower environmental footprint, and the average footprint of all relevant trees.

The architecture of machine readable instructions may also include a tree creation module 176. The tree creation module 176 utilizes output from the other modules (e.g., the tree reconstruction module 172 and the tree substitution module 174) to create new trees. The fundamental principle is that different systems may perform similar functions, but not necessarily be previously viewed in similar fashion. For example, a server computer may use a particular component hierarchy in the supply chain that is also relevant to a laptop computer. But the manufacturer may not have considered such a hierarchy for numerous reasons, not the least of which is the manufacturer's own belief that server computers are different than laptop computers.

It is noted that the functional modules are shown for purposes of illustration. Still other functional modules may also be provided. In addition, the functional modules may be combined with one another.

As noted above, the database 160 may store at least one tree with a plurality of nodes. Each node in the tree represents at least one characteristic of a system. For example, the database 160 may include a tree for a new computer. The new computer tree 250 may include nodes for the motherboard, the hard disk drive, the keyboard, and the display. The motherboard node may include information about cost, e.g., at least one of price, environmental impact, performance, product warranty, and customer satisfaction, among other characteristics of the motherboard.

Figure 2A:
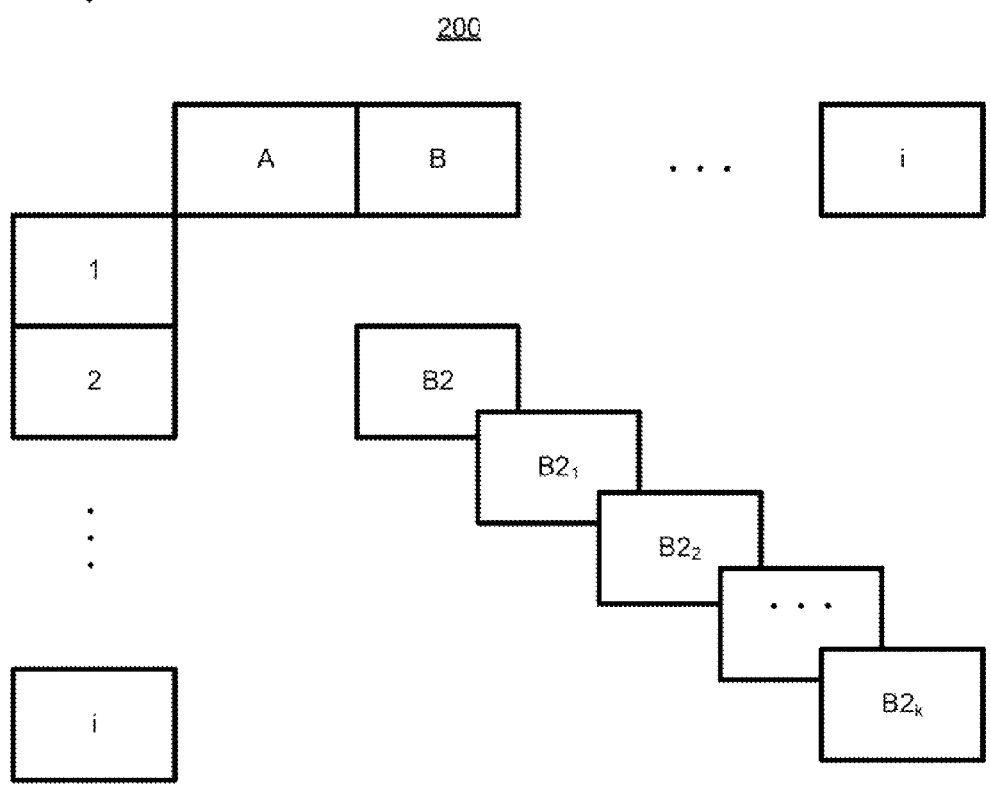
FIG. 2A illustrates an example structure for a multidimensional data structure.

In an example, the database 160 may be a multidimensional data structure. FIG. 2A illustrates an example structure for a multidimensional data structure. In this example, the database is configured as a matrix 200 with information for each node. Example information may include, but are not limited to the following characteristics: price, environmental impact, performance, product warranty, and customer satisfaction, to name only a few examples.

In FIG. 2, the matrix 200 includes a plurality of columns (A, B, . . . i) and a plurality of rows (1, 2, . . . j). The intersection of each row and column may be referenced by the combination of row label and column label. For example, the intersection of column B and row 2 may be referred to as B2. In an example, each row corresponds to a component of an electronic device, and is thus used to generate the nodes in trees. The columns correspond to characteristics for the components. In an example where column B is for a computer display and row 2 is for environmental impact, the intersection B2 may include environmental impact information (e.g., overall carbon footprint) for the computer display.

The matrix 200 is not limited to the two-dimensional example given above. In another example, the program code may go to the intersection B2, and then read forward/backward in a third dimension to obtain more detailed environmental impact information included in the overall carbon footprint calculation, such as but not limited to, energy use, toxic emissions, and waste disposal. For purposes of illustration, the addresses in the third dimension may be referenced using any suitable symbols, such as subscripts, wherein the address is $B2_1$, $B2_2$, $B2_k$.

The information in the multidimensional data structure may be included in, or referenced by the nodes in the trees. For example, a printed circuit board node may reference intersection B2 in the matrix 200 for environmental impact information related to that particular printed circuit board. It is noted that multiple nodes in different trees may reference the same address in the same matrix 200. By way of illustration, the printed circuit board nodes in a plurality of different computer trees may each reference the intersection B2 in the same matrix 200, if intersection B2 includes information for environmental impact that is the same for each printed circuit board.

The matrix 200 shown in FIG. 2A is shown and described herein as an example of an example of a data structure that may be used. It is noted, however, that the tree structures may be based on information provided in any suitable format(s).

Figure 2B:
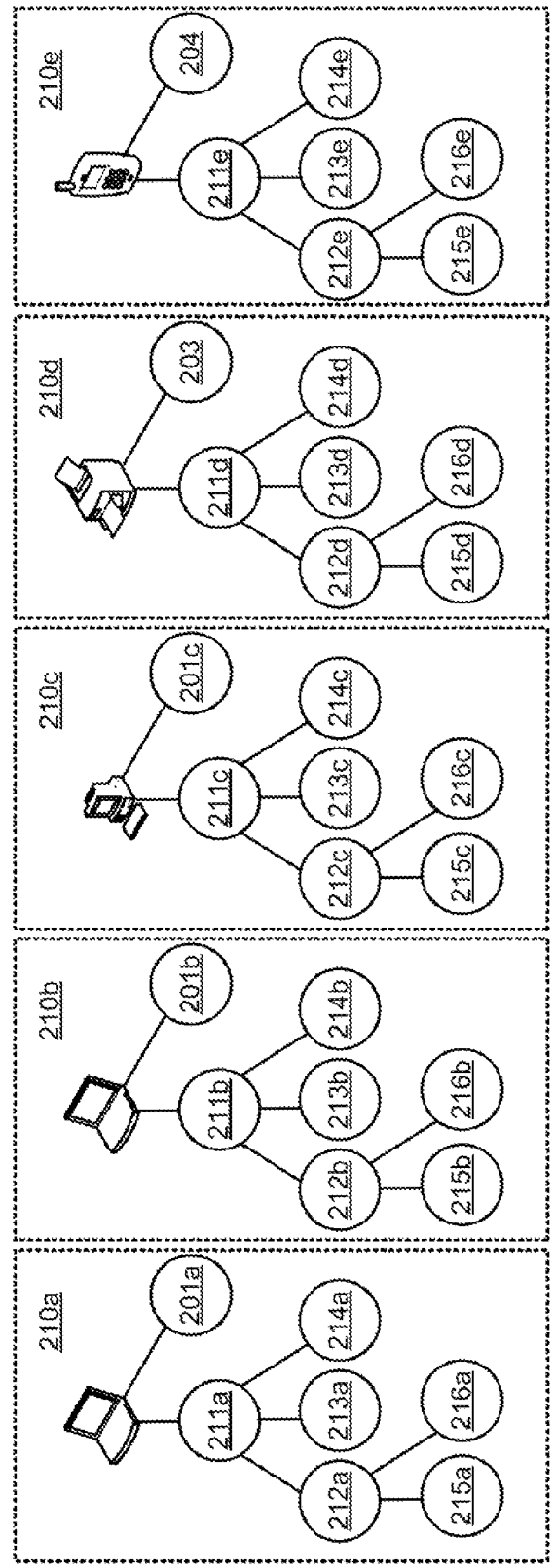
FIG. 2B illustrates a plurality of tree structures that may be provided in the data structure.

The tree structure provided in the database may be better understood from the following discussion with reference to FIG. 2A. FIG. 2B illustrates a plurality of tree structures 210a-e that may be provided in the database. The trees 210a-e each have a plurality of nodes. Each node in the tree 210a-e may further include subnodes, thereby defining a child-parent relationship between the nodes, and providing additional layers of granularity for the components of the system under consideration.

For purposes of illustration, the tree structures 210a-c are for computer devices. It is noted that any suitable number and type of other trees may be also used. For example, tree structure 210d is for a printer, and tree structure 210e is for a mobile phone. Accordingly, nodes that are suitable for substitution may be found in system trees that are not necessarily related to one another in a conventional sense. For example, a computer is different than a printer in most regards, which is different than a mobile phone. But there may be overlap in at least one of the nodes. For example, computers, printers, and mobile phones all have in common a processor, some degree of memory, and a housing.

In this example, all of the trees 210a-e (even the printer and mobile phone trees) include motherboard nodes 211a-e, in addition to nodes for other components. At least some of the other component nodes may be related in the different trees (e.g., nodes 201a-c are related). At least some of the other component nodes may not be related in the different trees (e.g., node 203 for ink cartridges in the printer tree 210d and node 204 for the antenna in the mobile phone tree 210e).

Continuing with this example, motherboard nodes 211a-c may include subnodes 212a-c for the circuit boards, subnodes 213a-c for the onboard memory, and subnodes 214a-c for the processors. These subnodes are each related to the respective motherboard nodes 211a-c as child nodes. Furthermore, the child nodes may also have child nodes of their own. For example, the circuit board nodes 212a-c may include child nodes 215a-c for the wafer and child nodes 216a-c for the metal traces.

During operation, program code (e.g., the database program code 150 in FIGS. 1A and 1B) is executed to create a system tree (e.g., system tree 210a in FIG. 2B) for a new electronic device (e.g., a new laptop computer). The program code is also executed to identify and analyze other trees (e.g., system trees 210b-e). In an example, the program code traverses the trees and detects at least one root node in each of the trees. For example, the program code may compare nodes of the new system tree 210a with laptop/netbook computer trees 210b, desktop computer trees 210c, printer trees 210d, and mobile phone trees 210e. Each of the trees may include root nodes for motherboards (nodes 211a-e in FIG. 2B). Root nodes may also be identified for one or more subnode. Accordingly, the motherboard node 211a (and/or the subnodes) in the system tree 210a for the new electronic device is compared to the motherboard nodes 211b-e in the other trees 210b-e.

The program may also be executed to rate the nodes. The nodes may be rated based on information in the database (e.g., in matrix 200 in FIG. 2A), to determine the suitability of a substitution. In an example, a higher rating may indicate a better candidate for substitution than a lower rating (although the opposite may also be true). For example, the motherboard node 211b of one of the laptop/netbook computer trees 210b may be assigned a higher rating for price than the motherboard node in the desktop computer trees 210c, because the price of the motherboard in the netbooks is lower than the price of the motherboard in the desktop computers. The motherboard node of the desktop computer trees 210c may be assigned a higher rating than the netbooks for performance. But the motherboard node 211b of the laptop/netbook computer trees 210b may receive higher ratings than the desktop computer trees 210c for environmental impact, because the processor in the laptop/netbook computers is more energy efficient.

The processor in one type of laptop computer may be more energy efficient than the processor in another laptop computer, and therefore the motherboard node for one of the laptop computer trees 210b may receive a higher rating than the motherboard node for the other laptop computers in the same group of trees 210b. The ratings may also be weighted. For example, environmental impact may receive a higher weighting if environmental impact is more pertinent to the user than price.

Figure 2C:
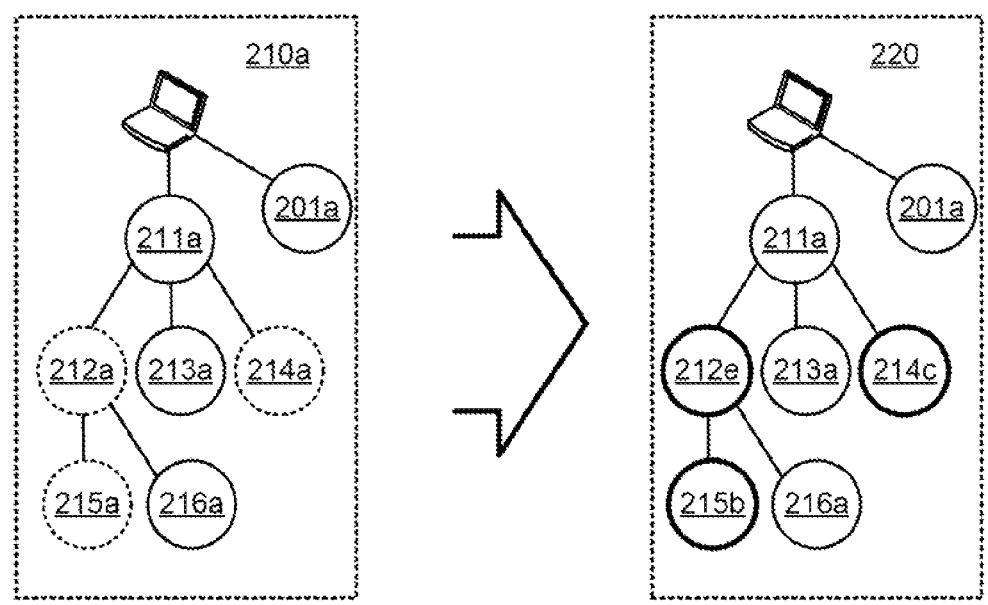
FIG. 2C shows an example of a new system tree.

After a suitable substitution is determined, the program code may further be executed to create a new tree for the new electronic device using node replacement or substitution based on nodes and/or subnodes in other trees. FIG. 2C shows an example of a new system tree 220. In this example, the new tree 220 is created from the tree 210a. But the new tree 220 is created with the node 215b from the laptop computer tree 210b because this node has the best rating for environmental impact. The new tree 220 is also created with the node 214c from the desktop computer trees, because this node has the best performance. The new tree 220 is also created with the node 212e from the mobile phone tree because this node has the lowest price.

It is readily appreciated from the above discussion that the systems and methods may be utilized to provide a quick assessment of a large amount of manufacturing information for a wide variety of different systems, and with high accuracy. The systems and methods may be used to modify the design of many types of systems, such as device manufacture, by reducing the price to manufacture, reducing the impact the device has on the environment, and reducing warranty calls, all while increasing customer satisfaction with the product. These considerations are particularly relevant for so-called "fleet" customers or enterprise customers who purchase electronic devices in large quantities, and therefore carefully consider the many different impacts of their purchases.

In this regard, the systems and methods may be implemented as a product assessment service. For example, the systems and methods may be used by enterprises who demand emissions reduction or compliance with environmental goals and/or regulations. Many of these enterprises are turning to their vendors to help assess, monitor, and reduce their environmental footprint. The systems and methods not only enable manufacturers to competitively reduce the environmental footprint of their customers, but to also competitively reduce the environmental footprint of their own supply chain.

These considerations are also relevant to consumers who are becoming more conscious of the impact their own purchases have on the environment.

In addition to environmental impact, the systems and methods also provide the foundation for significant savings, both direct (e.g., supply-side) and indirect (e.g., reducing warranty calls). The ability to automate product analysis may be a differentiator for some manufacturers in reducing price for smaller customers, and scaling to meet the demands of larger customers, while maintaining or even growing profit margins.

The systems and methods described herein facilitate discovering trees in a database using data mining techniques. In an example, data mining techniques may be used to discover trees as follows. The system under consideration forms the parent/root of the tree and the constituents of the system are its children. The database is searched such that the impact of the parent node correlates with or substantially correlates with the impacts of the children nodes within a threshold degree of accuracy. Since exhaustive enumeration of all possible child nodes may not be practical (considering the number of nodes in the database), sampling may be used. Once a set of children nodes are selected for a parent, statistical analysis, such as but not limited to non-negative least squares (NNLS), may be used to determine the coefficients of those children nodes. In an example, a four-step process may be utilized to search for a tree.

After the children nodes and corresponding coefficients of the system under consideration is determined, the impact contribution of each child node to the parent node impact can be estimated. Such a technique allows identification of the children nodes that contribute the most to any given impact. This information may also be used to improve the design of the system under consideration.

Given a parent, the tree discovery task includes of determining the children, and the coefficient for each child. The term "coefficient" may be used herein, for example, to mean the quantity of the child node. In one embodiment, the hierarchical structure among the child nodes is also determined. For a given parent and a set of children, we use non-negative least squares (NNLS) regression to find the coefficients that provide the best correlation. Note that due to missing information and inaccuracies in the impact estimates, the sum of the child impacts may only approximately equal that of the parent.

In an example the following steps may be implemented to discover the tree for a given parent. First, generators may be identified. A "generator" is a minimal set of child nodes whose impact factors match those of the parent within a certain error threshold. If finding all generators is computationally difficult for a particular system under consideration, a sample of generators may be determined. An example of a technique associated algorithm that may be used to compute a particular generator is described below. Then, a number of generators containing each potential child node may be computed, and the distribution of the other nodes in those generators tabulated.

Generators give a good idea about the possible set of nodes to be considered. But the nodes in a generator are inextricably tied to the other nodes, and thus it is instructive to have some understanding of how nodes co-exist in generators. This can be accomplished using a sampling approach. Specifically, the following example technique that can be executed using the example algorithm may be applied for each node ni. The resulting distribution is tabulated as a matrix. Table 1 shows an example matrix.

TABLE 1

Example sampled distribution of constraints between NNLS fits

|      | 271 | 364 | 411 | 664 | 1056 | 1171 | 7063 | 7224 | 9272 |
|------|-----|-----|-----|-----|------|------|------|------|------|
| 271  | 40  | 0   | 0   | 0   | 40   | 0    | 0    | 40   | 0    |
| 364  | 0   | 40  | 0   | 0   | 40   | 0    | 0    | 40   | 0    |
| 411  | 0   | 0   | 40  | 0   | 40   | 0    | 0    | 40   | 0    |
| 664  | 0   | 0   | 0   | 40  | 40   | 0    | 0    | 40   | 0    |
| 1056 | 0   | 0   | 0   | 0   | 40   | 0    | 0    | 40   | 0    |
| 1171 | 0   | 0   | 0   | 0   | 40   | 40   | 0    | 40   | 0    |
| 7063 | 0   | 0   | 0   | 0   | 0    | 40   | 40   | 40   | 0    |
| 7224 | 0   | 0   | 0   | 0   | 0    | 40   | 0    | 40   | 0    |
| 9272 | 0   | 0   | 0   | 0   | 0    | 40   | 0    | 40   | 40   |

It is readily apparent that there exist some symmetric and asymmetric relationships. For example, when 271 is fixed, nodes 7224 and 1056 appear; however 271 does not appear when either nodes 7224 or 1056 are fixed. In contrast, a symmetric relationship is observed when either nodes 7224 or 1056 are fixed. That is, the other node appears in its row. These relationships may be used in the following processing.

Next, candidate trees are identified. The rows of the distribution matrix (Table 1) are clustered into groups, with preference for balanced clusters. Recall that the rows of the matrix denote conditional distributions and hence the process aims to identify similar conditioning contexts. The resulting list of clusters C is then subject to several processing steps, as can be executed as described in the following Example 1.

EXAMPLE 1

```
Require: A list of clusters C
Ensure: A list of reduced clusters C_4
    C_1 ← RemoveFixed(n,C)
    C_2 ← IncreaseFits(n,C_1)
    C_3 ← IncreaseFits(n,C_2)
    C_4 ← RemoveFixed(n,C_3)
```

The first step in Example 1 (RemoveFixed), can be executed as described in Example 2.

EXAMPLE 2

```
Require: Parent node n
Require: A set of clusters C
Ensure: A set of reduced clusters C'
    t ← NNLS(n,C)
    C' ← 0
    for each c ∈ C do
        if f(n, C - {c}) = t then
            C' ← C' ∪ {c}
        end if
    end for
```

Here the list of clusters is reduced. That is, the currently possible number of fits is assessed to remove clusters such that the number of fits does not change. The next described step (IncreaseFits) can be executed as described in Example 3.

EXAMPLE 3

```
Require: Parent node n
Require: A list of clusters C
Ensure: A list of reduced clusters C'
    c ← unvisited cluster in C
    T ← C - {c}
    t ← NNLS(n,C)
    if all c ∈ C has been visited then
        C' ← C
        exit
    end if
    if |c| >= 2 then
        Mark c as visited
        s ← Select s ∈ c such that NNLS(n,T ∪ s) is
            minimum
        t' ← NNLS(n,T ∪ s)
        if t' ≥ t then
            IncreaseFits(n,C s)
        else
            IncreaseFits(n,C)
        end if
    else
        Increasefits(n,C)
    end if
```

Here, finer-grained pruning of clusters is accomplished by considering the removal of nodes within clusters. In the next step (RemoveFixed), any extraneous clusters are removed. The result from Example 1 is a set of clusters with possibly different numbers of elements.

Next, a consensus tree is identified. Example 4 describes an approach to identify a final consensus tree.

EXAMPLE 4

```
Require: Set of candidate trees S
Ensure: Consensus tree T
    avgC ← average number of clusters in S
    C ← select avgC (rounded) most frequent clusters
    Z_i ← mean number of nodes (rounded) cluster c_i ∈ C
    T ← for each cluster c_i ∈ C select Z_i most frequent
        nodes in the cluster
```

First, representative number of clusters found in the candidate trees is identified. For example, the representative number can be an average number of the clusters. For each cluster, the number of nodes can be selected to be a representative size of the clusters, such as but not limited to the mean sizes of clusters found in candidate trees. Next, the most frequent nodes in each cluster is selected as the final tree.

Then, multi-level trees are identified for trees with multiple levels. Finding multi-level trees is broken down to a procedure that includes finding a consensus tree, finding trees within the set of nodes discovered, superposing all found trees, and computing their transitive reduction. Essentially, this flattens out the multi-level tree into a single tree and uses containment relationships within the nodes of this unified tree to reconstruct the hierarchy.

Before continuing, it should be noted that the examples described above are provided for purposes of illustration, and are not intended to be limiting. Other devices and/or device configurations may be utilized to carry out the operations described herein.

Figure 4:
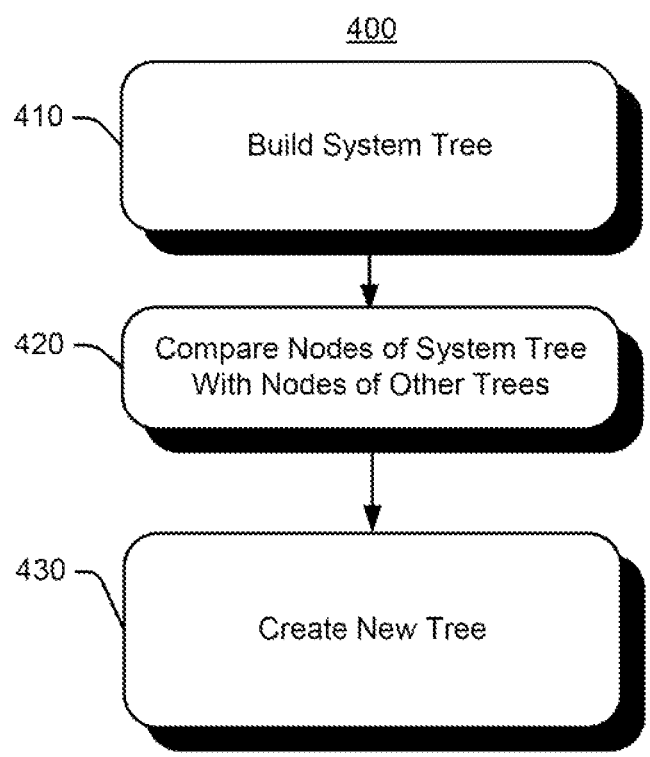
FIG. 4 is a flowchart illustrating example operations of component substitution that may be implemented.

FIGS. 3 and 4 are flowcharts illustrating example operations of component substitution which may be implemented. Operations 300 and 400 may be embodied as machine readable instructions on one or more computer-readable medium. When executed on a processor, the instructions cause a general purpose computing device to be programmed as a special-purpose machine that implements the described operations. In an example implementation, the components and connections depicted in the figures may be used.

FIG. 3 is a flowchart illustrating example operations 300 of tree discovery which may be implemented. In operation 310, a first (e.g., parent) node for a system under consideration is identified in computer-readable medium. Each node in the computer-readable medium may represent a characteristic of a component. In operation 320, at least one second (e.g., child) node is selected from the computer-readable medium for the first node. In an example, a set of second (e.g., children) nodes may be selected for the first node. The set of second nodes is selected if an impact of the first node substantially correlates with and may substantially match a sum of impacts of all second nodes in the set. The term "substantially correlates" or "substantially match" may be within a threshold degree of accuracy.

In operation 330, at least one system tree for the system under consideration is discovered in the computer-readable medium based on the first and second nodes.

The operations discussed above are provided to illustrate various examples. It is noted that the operations are not limited to the ordering shown. Still other operations may also be implemented.

For purposes of illustration, further operations may also include estimating impact contribution of the first node based on contribution of each second node. The method may also include determining a coefficient for each second node selected. The method may also include sampling the computer-readable medium to identify at least one second node for selecting. Sampling may include identifying generators, identifying candidate trees, identifying a consensus tree, and identifying multi-level trees.

FIG. 4 is a flowchart illustrating example operations 400 of component substitution which may be implemented. In operation 410, building a system tree having a plurality of nodes, each node in the system tree representing a characteristic of a component of the system under consideration. For example, a tree may be for a new laptop computer. The tree may include a motherboard node, a keyboard node, a hard disk drive node, and a display node. The keyboard node may further include a housing node, a cabling/wireless node, and a circuit board node. In this example, the keyboard node is the parent node and the housing node, cabling/wireless node, and circuit board node are child nodes of the keyboard node. Any degree of granularity may be utilized based at least to some extent on design considerations (including desired output, and time to process).

In operation 420, comparing nodes of the tree with nodes in other trees is performed to identify common nodes (or root or similar node). Continuing with the example from operation 410, the tree for the new laptop computer may be compared with trees for other computers, such as other laptop computers, netbook computers, desktop computers, servers, server blades, etc. The common node may be the keyboard node in each of these other trees. Or the common node may be the circuit board child node for the keyboard node or even the motherboard node.

It is noted that, in this example, the tree for the new laptop computer may also be compared with trees for other, at least somewhat unrelated electronic devices. For example, the processor or memory in a mobile phone may be a suitable substitute for the processor or memory in another electronic device, such as a printer.

In operation 430, generating a new tree for the system by replacing at least one of the common nodes in the system tree with at least one of the nodes in the other trees. For example, the processor from another laptop computer may be substituted for the processor originally chosen for the new laptop computer to give the new laptop computer a lower environmental impact, lower price, higher customer satisfaction, longer warranty, etc. than the initial design for the new laptop computer may have delivered.

It is noted that various of the operations described herein may be automated or partially automated. For example, building system trees may be fully automatic using retrieval routines executed by program code. Alternatively, at least some user interaction may be provided. In such an example, the user may manually provide production specification(s), and then building system trees may be automatic based at least in part of the user-provided product specification(s). The level of user interaction may be any suitable degree. For example, the user may simply identify that the new electronic device is to be an inkjet printer. Alternatively, the user may identify individual components of the inkjet printer, including but not limited to, the type of ink cartridges, processor speed, memory size, and paper tray options.

In an example, the component substitution operations may be implemented with a customer interface (e.g., web-based product ordering interface). The customer is able to make predetermined selections (e.g., specifying minimum processor speed), and the operations 410-430 described above are implemented on a back-end device to present the user with various designs that meet the customer's minimum expectations. The user can then further select which of the alternatives best suit the customer's preferences (including, e.g., for price, environmental impact, customer satisfaction, and warranty).

Further operations may also include rating the nodes, wherein replacing the at least one of the nodes in the system tree is based on the rating of the nodes. For example, a processor having a higher energy efficiency rating may receive a higher ranking for environmental impact. A processor that is priced lower may receive a higher ranking for price. A processor that has a higher customer satisfaction may receive a higher ranking for customer satisfaction. The rankings may further be weighted. For example, if the user values a lower environmental impact above price, then the rating for environmental impact is assigned a higher weight than price.

Still further operations may also include populating a database with characteristics of a plurality of components. The characteristics of the components may include pride, environmental impact of the components, customer satisfaction, warranty, and other characteristics dependent at least to some extent on design considerations. Some design considerations may include which characteristics are desired by the user, required by regulation, set forth in company policy, and used to meet manufacturing goals, to name only a few examples.

Still further operations may also include identifying structural relationships between the plurality of nodes in the system tree and the nodes in the other trees. For example, structural relationships may include, but are not limited to, parent-child nodes, and parent-grandchildren nodes.

Still further operations may also include determining at least one substitute component based on the new tree. In an example, further operations may include outputting a bill of materials with the at least one substitute component based on the new tree. The bill of materials may be printed for a user (e.g., a consumer). In an example, the bill of materials may be vetted (e.g., by a design engineer) to ensure that any substitutions are appropriate. For example, a high-efficiency processor for a laptop computer may not be an appropriate substitution for a mobile phone.

It is noted that the examples shown and described are provided for purposes of illustration and are not intended to be limiting. Still other embodiments are also contemplated.

The invention claimed is:

1. A tree discovery method, the method carried out by program code stored on non-transient computer-readable medium and executed by a processor, the method comprising:
   identifying in computer-readable medium a first node for a system under consideration, each node in the computer-readable medium representing a characteristic of a component;
   selecting at least a second node from the computer-readable medium for the first node, the at least second node selected from a non-exhaustive sampling of nodes as a child node of the first node contributing more to an impact on the system under consideration than any other child node of the first node; and
   discovering in the computer-readable medium at least one system tree for the system under consideration based on the first node and the at least second node.

2. The method of claim 1, wherein a set of second nodes is selected for the first node.

3. The method of claim 2, wherein the set of second nodes is selected if an impact of the first node substantially matches a sum of impacts of all second nodes in the set.

4. The method of claim 3, wherein substantially matches is within a threshold degree of accuracy.

5. The method of claim 1, further comprising estimating impact contribution of the first node based on contribution of each second node.

6. The method of claim 1, further comprising determining a coefficient for each second node selected.

7. The method of claim 1, further comprising sampling the computer-readable medium to identify the at least second node for selecting.

8. The method of claim 7, wherein sampling comprises at least one of identifying generators, identifying candidate trees, identifying a consensus tree, and identifying multi-level trees.

9. A tree discovery system, comprising:
   a non-transitory computer readable storage to store a plurality of nodes, each of the plurality of nodes representing a characteristic of a component; and
   an analysis engine stored on a non-transitory computer readable medium and executable by a processor, the analysis engine operatively associated with the computer readable storage to identify a first node for a system under consideration, and select at least a second node for the first node, the at least second node selected from a non-exhaustive sampling of nodes as a child node of the first node contributing more to an impact on the system under consideration than any other child node of the first node, wherein at least one system tree is generated for the system under consideration based on the first and second nodes.

10. The system of claim 9, wherein the analysis engine selects a set of second nodes for the first node, the set of second nodes selected based on impact of the first node substantially matching a sum of impacts of all second nodes in the set.

11. The system of claim 9, wherein the analysis engine estimates impact contribution of the first node based on contribution of each second node.

12. The system of claim 9, wherein the analysis engine determines a coefficient for each second node selected.

13. The system of claim 9, wherein the analysis engine samples the computer-readable medium to identify the second node.

14. The system of claim 13, wherein sampling comprises identifying generators, identifying candidate trees, identifying a consensus tree, and identifying multi-level trees.

15. The system of claim 14, wherein identifying generators comprises computing a distribution of other nodes in the generators.

16. The system of claim 14, wherein identifying candidate trees comprises clustering portions of a matrix and removing nodes from the clustered portions.

17. The system of claim 14, wherein identifying a consensus tree comprises identifying clusters in candidate trees and selecting most frequently appearing nodes in each cluster as a final tree.

18. The system of claim 14, wherein identifying multi-level trees comprises superimposing all found trees and computing a transitive reduction to obtain a single tree.

19. A tree discovery system, comprising:
   an analysis engine stored on a non-transitory computer readable storage and executable by a processor to identify a first node for a system under consideration, and select at least one second node for the first node, the at least one second node selected from a non-exhaustive sampling of nodes as a child node of the first node contributing more to an impact on the system under consideration than any other child node of the first node; and
   a tree generator to discover a system tree for the system under consideration based on the first node and the at least one second node.

20. The system of claim 19, wherein the analysis engine samples the computer-readable medium to identify the at least one second node by identifying generators, identifying candidate trees, identifying a consensus tree, and identifying multi-level trees.

* * * * *